United States Patent [19]

Morrison

[11] Patent Number: 4,645,264
[45] Date of Patent: Feb. 24, 1987

[54] MOTORIZED DUMPING VEHICLE

[76] Inventor: Donald R. Morrison, 6228 Eagle Peak Dr., Charlotte, N.C. 28214

[21] Appl. No.: 690,460

[22] Filed: Jan. 10, 1985

[51] Int. Cl.$^4$ .............................................. B60H 1/22
[52] U.S. Cl. ...................................... 298/1 H; 165/41; 180/19.1; 298/1 C
[58] Field of Search ...................... 180/19.1, 19.2, 308; 280/5 F, 782, 783; 298/1 H, 1 C, 2; 165/41

[56] References Cited

U.S. PATENT DOCUMENTS

| | | | |
|---|---|---|---|
| 2,424,670 | 7/1947 | Shimer | 298/1 C |
| 2,427,132 | 9/1947 | Godbey | 298/1 C |
| 2,533,549 | 12/1950 | Bell | 298/2 |
| 2,683,295 | 7/1954 | Howlett et al. | 298/2 X |
| 3,692,135 | 9/1972 | Holzmann | 180/19.1 |
| 3,695,708 | 10/1972 | Vincenty | 298/1 H |
| 4,555,200 | 11/1985 | Morrison | 404/72 |

Primary Examiner—Joseph E. Valenza
Assistant Examiner—Janice Krizek
Attorney, Agent, or Firm—B. B. Olive

[57] ABSTRACT

A motorized dump-type vehicle is provided having a chassis frame, a gasoline engine mounted on said frame, a dump container pivotally mounted on the front of said frame and a hydraulic system enabling said container to be raised and lowered by a hydraulic cylinder and said vehicle to be driven in either forward or reverse directions and braked by hydraulic drive motors. The hydraulic fluid is cooled by an oil reservoir tank forming a structural part of the frame and positioned such that heat from the hydraulic fluid can dissipate itself in the container and its contents.

2 Claims, 7 Drawing Figures

MOTORIZED DUMPING VEHICLE

DESCRIPTION

Technical Field

The invention relates to a motorized load-carrying vehicle with a load-carrying pan tipped by power-operated means on the vehicle.

BACKGROUND ART

Concrete construction and other work requiring on-the-job transport of heavy materials from one location to another has brought about the development of a variety of relatively-small, load-carrying vehicles capable of moving on the job site with relatively small but often very heavy loads of material. For example, a frequent need is to load a quantity of concrete at a first location, transport such concrete to a second location and then dump the contents for spreading and screeding operations at the second location. In concrete work such vehicles are often referred to as a "concrete buggy". They may also be referred to as a dump truck or power-driven wheelbarrow. Some of such vehicles are of the walk-behind type while others are of the step or seat-riding type. The load which is carried by a container called a "skip", "hopper", "pan", or "dump box" is conventionally raised and lowered by a hydraulic piston as in U.S. Pat. Nos. 2,424,670 or 2,427,132. A front pair of single or dual wheels is conventionally driven by a differential and transmission as in U.S. Pat. No. 2,427,132. In the three-wheel-type vehicle, a single or dual wheel supports the rear of the vehicle and is adapted for rotating around a vertical axis for the purpose of steering the vehicle and sometimes with use of a steering mechanism as in U.S. Pat. No. 2,427,132. The conventional way of braking the vehicle is by use of mechanical brakes as illustrated in U.S. Pat. Nos. 2,427,132 and 2,530,574.

With the above brief description of those aspects of the concrete buggy-type prior art apparatus deemed pertinent to the present invention, it will be immediately apparent that there is a continuing need for improvements in the manner in which a vehicle of this type is driven as well as in the manner of braking the vehicle, particularly when carrying a heavy load. While mechanical drive systems have prevailed, it has been known to employ a hydraulic drive motor for driving a single rear wheel instead of mechanically driving two front wheels as is the conventional practice. In this regard, the Prime-Mover Company of Muscatine, Iowa 52761, has made a three-wheel vehicle for handling packaged or palletized brick or block and sold as the L-32 and L-36 models of what is referred to as a "straddle-type mason tender". In the hydraulic system employed in the Prime-Mover apparatus both forward and reverse action as well as braking action are said to be achieved with a single hydraulic drive motor. However, except for this type of three-wheel vehicle in which a single rear wheel is driven by a single hydraulic drive motor, applicant is unaware of any other attempts that have been made to use hydraulic drive motors for driving three wheel concrete buggy type vehicles.

The present invention seeks to improve upon the aforementioned prior art by providing in a motorized so-called "three-wheel-type dump vehicle" a hydraulic drive system for the front wheels, with means in the hydraulic system enabling the front wheels to act as brakes and also with means whereby the hydraulic fluid can be cooled within a reservoir which acts both as a structural frame member and as a uniquely-arranged heat sink in which the concrete or other relatively-cool material being transported is used to absorb heat from the hydraulic fluid. In other aspects, the invention also seeks to provide an improved hydraulic system enabling both the dump box as well as the front wheels to be hydraulically operated and with a minimum requirement of horsepower in the gasoline engine used as the prime source of power for the vehicle. Other objects will become apparent as the description proceeds.

DISCLOSURE OF INVENTION

The invention provides a three-wheel-type motorized vehicle with a tilting dump box pivotally mounted upon the forward end of the vehicle chassis. A small horsepower gasoline engine mounts on the rear end of the chassis and operates a two-stage hydraulic pump. The hydraulic pump forms part of a hydraulic system for operating the dump box and separate hydraulic drive motors on the front wheels. The hydraulic system also includes a reservoir forming a structural part of the chassis and located so as to use the material being transported, e.g., relatively cool concrete, for absorbing heat from the hydraulic fluid passing through the reservoir. The two-stage pump controls the volume of oil pumped as required to maintain appropriate hydraulic pressure as the amount of load changes, e.g., heavy loads, light loads, uphill and downhill transport situations. Walk behind, riding stop and riding seat-type variations of the invention vehicle are disclosed.

Figure 7:
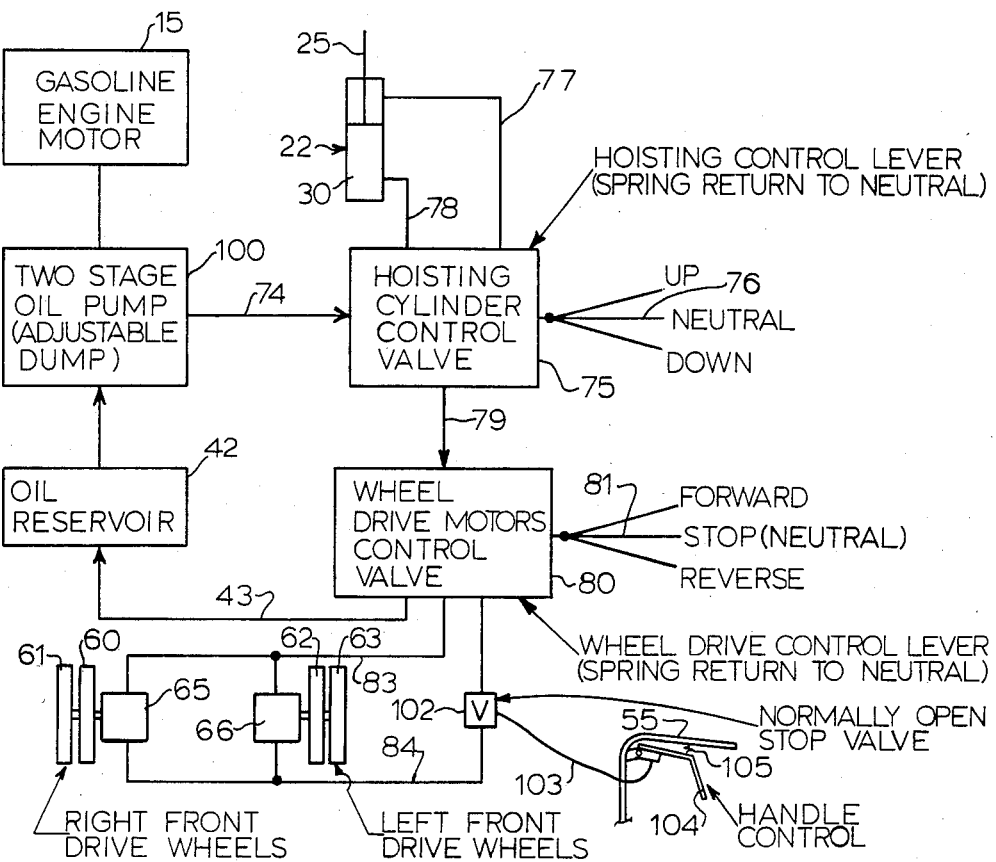
FIG. 7 is a schematic diagram of the hydraulic system employed with the vehicle.
Figure 4:
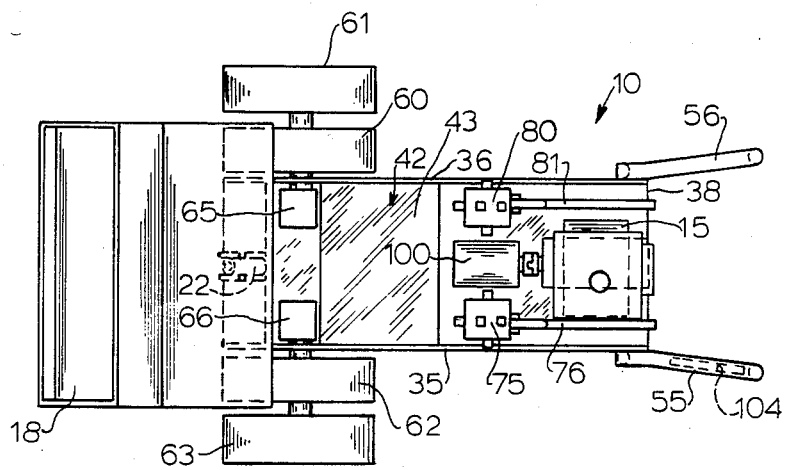
FIG. 4 is a plan view of the vehicle of FIG. 1 with the dump box raised to illustrate the location of the reservoir and other hydraulic system components.

For clarity, the hydraulic conduits illustrated in FIG. 7 are not shown in the other figures.

BEST MODE FOR CARRYING OUT THE INVENTION

Figures 1, 2:
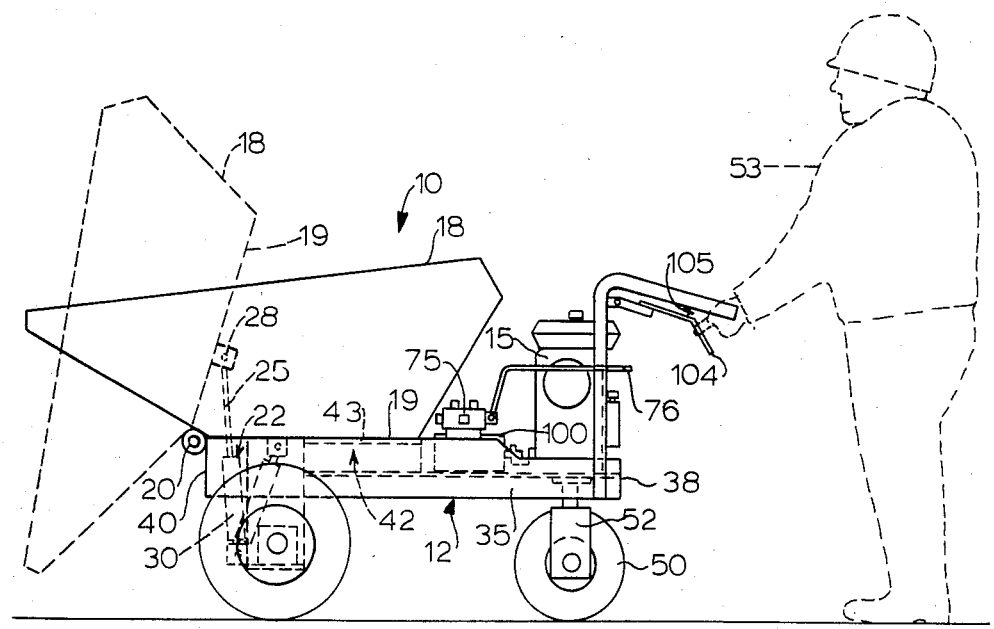
FIG. 1 is a side elevation view of a motorized dumping vehicle according to a first embodiment of the invention with the dump box indicated in solid lines in a transport position and in dashed lines in a dumping position and a typical operator also depicted in dashed lines.
FIG. 2 is a rear elevation view of the vehicle of FIG. 1.
Figure 3:
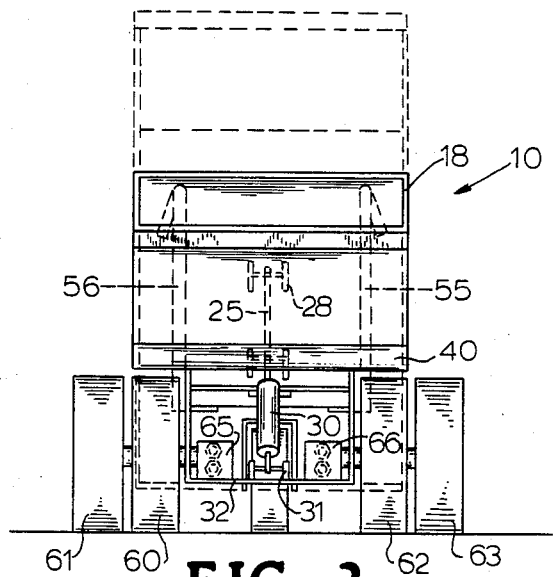
FIG. 3 is a front elevation view of the vehicle of FIG. 1.

Making reference initially to FIGS. 1–4 and FIG. 7, the invention vehicle 10 comprises a rectangular metal formed chassis 12 mounting a small, e.g., seven and one-half horsepower gasoline engine 15 at its rear end and a metal formed dump box load container 18 at its front end. Dump box 18 has a suitable pivotal mount 20 and is raised and lowered by hydraulic piston/cylinder 22 by means of rod 25 pivotally connected to bracket 28 on the bottom wall of dump box 18 and cylinder 30 pivotally connected on bracket 31 mounted on bar 32 (FIG. 3).

Chassis 12 is made up of side frame members 35, 36 and end frame members 38, 40. A metal oil reservoir tank 42 extends between and is welded to the metal side frame members 35, 36. Tank 42 forms a structural part of chassis 12. Further, the top wall 43 of tank 42 is located immediately below the bottom wall surface 19 of dump box 18 when in the transport position. Heat in tank 42 can thus be transmitted through walls 43 and 19. Thus, when relatively cool concrete is placed in dump box 18, such concrete acts as a heat sink for removing heat stored in reservoir tank 42. Since substantial heat develops in the hydraulic system of the invention, particularly when the vehicle 10 is carrying relatively heavy loads, climbing a steep incline, or the like, an important feature of the invention is to provide a reservoir tank which serves the normal purpose of an oil reservoir as well as serving as a structural part of the vehicle chassis and which is located in a manner wherein the dump box itself as well as the material being transported can be used to absorb heat stored in the hydraulic fluid passing through the reservoir.

Chassis 12 is supported in the rear by a single wheel 50 having a pivotal mount 52 below engine 15 enabling the operator 53 to steer by use of the handles 55, 56 swiveling wheel 50 on its vertical axis to change the direction of travel of vehicle 10. The front of chassis 12 is supported by two sets of dual wheels 60, 61 and 62, 63 to provide increased load carrying wheel surface as compared to use of single front wheels in the normal three-wheel type vehicle. Thus, while single front wheels could be substituted for the illustrated dual wheel arrangement on the front of chassis 12, vehicle 10 provides, in effect, a three-wheel-type vehicle with increased load-bearing wheel surface.

Wheels 60, 61 are driven by hydraulic motor 65 mounted on support bar 32 and wheels 62, 63 are driven by hydraulic motor 66, also mounted on support bar 32 beneath chassis 12. Thus, another important and unique feature of the invention is to drive the vehicle 10 by means of front wheels which are individually hydraulically powered by separate hydraulic motors, a feature in the configuration of the invention believed to be unique in the industry and offering numerous advantages particularly when transporting, reversing and braking heavy loads in industrial applications.

Continuing the description in reference to FIGS. 1-4 and FIG. 7, hydraulic piston/cylinder 22 for raising and lowering dump box 18 is controlled by valve 75 through control lever 76, and drive wheel motors 65, 66 are controlled through valve 80 through control lever 81. As best illustrated in FIG. 7, it will be noted that the gasoline engine 15 drives a two-stage oil pump 100 with an adjustable dump such as employed in log splitters wherein the volume of oil pumped and the system pressure automatically varies as the load varies thereby enabling a relatively-small gasoline engine to be employed for hauling relatively-heavy loads. A Delta pump is one such pump in which under heavy load fluid volume is reduced and pressure is increased and under light load fluid volume increases and pressure decreases. Valves 75 and 80 are both of the type having a spring return to a neutral position in the case of valve 75 or stop-neutral position in the case of valve 80. The output of pump 100 is fed entirely to the control valve 75 through conduit 74 from which most of the fluid is continuously diverted through conduit 79 to the drive motors control valve 80 and when desired to one side or the other of piston/cylinder 22 through conduits 77, 78. Valve 80 may be latched in the forward position by latching control lever 81 in notch 91 formed in bracket 92 (see FIG. 2). Conduit 43 provides a return line from valve 80 to reservoir tank 42.

Pressurized fluid is admitted to one side or the other of the respective drive motors 65, 66, through conduits 83, 84 depending on whether control lever 81 is in the forward or reverse position. Braking is achieved by closing the normally-open control valve 102 by utilizing a control cable 103 and pivoted handle 104 loaded by spring 105 and mounted on handle 55. Thus, braking is achieved very effectively and in a simple manner using the drive motors 65, 66 as a front wheel braking device thus eliminating the need for any additional braking mechanism.

Figure 5:
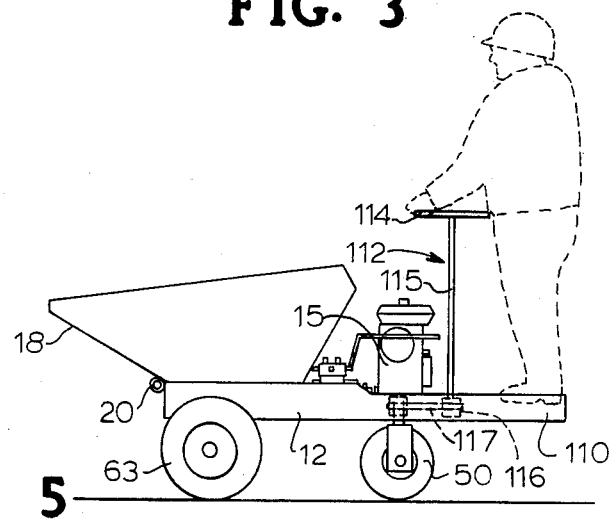
FIG. 5 is a side elevation view of the vehicle of FIG. 1 modified in a second embodiment as a riding step-type vehicle with the operator depicted in dashed lines.
Figure 6:
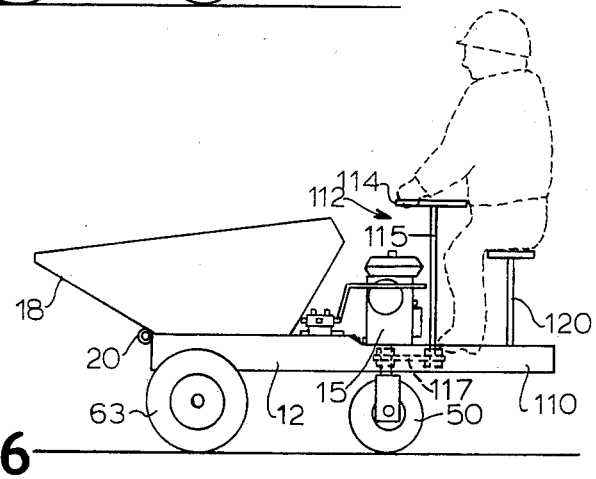
FIG. 6 is a side elevation view of the vehicle modified in a third embodiment as a riding-seat-type vehicle with the operator shown in dashed lines.

The invention vehicle readily adapts to the riding-step-type vehicle as illustrated in FIG. 5 wherein there has been added a step platform 110 secured to chassis 12 and a conventional steering mechanism 112 having a steering wheel 114, a steering rod 115 and steering gear box 116 suitably connected through chain 117 to pivot rear wheel 50. The invention also readily adapts to the seat-riding-type vehicle as shown in FIG. 6 wherein there has been added the seat 120 to the FIG. 5 construction.

Having described the improved hydraulically driven and dump vehicle of the invention, it can be seen that the invention provides improvements in a unique reservoir forming both a structural part of the chassis as well as being uniquely located to dissipate the substantial amount of heat that is inevitably developed in a hydraulic system under heavy load. Further, the invention can also be seen to provide an extremely simple hydraulic front wheel drive mechanism for achieving both forward and reverse directions of travel as well as a quick and effective means for braking, either under normal or emergency conditions. Additionally, by use of the two-stage oil pump, the invention also achieves the advantage of being able to use a relatively small horsepower engine for transporting relatively heavy loads.

What is claimed is:

1. A motorized dump-type vehicle for on-the-job transporting of concrete or other materials, comprising:
   (a) a rectangular metal formed chassis frame having integrally-joined side, front and rear members defining in transit front and rear ends thereof;
   (b) a gasoline engine mounted above and on the rear end of said frame;
   (c) an open top dump container having metal formed side and bottom walls, said container being supported on said frame forwardly of said engine and having a bottom front end portion pivotally mounted on the front end of said frame;
   (d) a pair of oppositely positioned hydraulic drive motors secured to said frame below the front end thereof;
   (e) a pair of front driving ground-engaging wheels located on opposite sides of said frame front end and each said wheel being drivingly connected to a respective said hydraulic drive motor enabling said wheels to be driven thereby;
   (f) a single hydraulic piston/cylinder having one end pivotally mounted on said frame centrally of the width thereof and the opposite end pivotally connected to the bottom wall of said container centrally of the sides thereof enabling said container to be raised and lowered by admitting pressurized fluid to one side or the other of said piston/cylinder;

(g) rear ground-engaging wheel means mounted below and centrally of the rear end of said frame on support means enabling said rear wheel means to swivel about a vertical axis passing through said support means and through said engine for steering said vehicle;

(h) a metal formed hydraulic fluid tank secured to said frame between the side members thereof and structurally reinforcing said frame, said tank having an input connection for receiving and storing heated hydraulic fluid and an output connection for withdrawing fluid to be pumped, said tank having a top wall positioned so as to be immediately below and covered by the bottom wall of said container when said container is in its transport position thereby enabling heat stored in said tank to be dissipated through said tank top wall and bottom wall of said container and transferred to cooler material being transported in said container;

(i) an adjustable dump oil pump mounted on said frame and drivingly connected to said engine, said pump having a pump input connection to the output connection of said tank and a pump output connection; and (j) a hydraulic valve and conduit system connected between said pump output connection and said tank input connection including a first lever-controlled valve connected by conduit to said piston/cylinder for raising and lowering said container and a second lever-controlled valve connected by conduit to said hydraulic drive motor means for forward and reverse driving of said front wheels.

2. A motorized dump-type vehicle as claimed in claim 1 wherein in said hydraulic valve and conduit system:

(a) said first valve has a conduit connection to said pump output connection, a pair of conduit connections connected to opposite sides of said piston/cylinder and another conduit connection connected to said second valve;

(b) said second valve has one conduit connection to the input connection of said tank, a second conduit connection to one side of each of said hydraulic drive motors and a third conduit connection to the opposite side of each of said drive motors; and (c) including a normally open, braking valve located in a conduit extending between one side of said hydraulic drive motors and said second valve and manual control means enabling said braking valve to be closed to stop the flow of fluid through both said hydraulic drive motors to brake said vehicle.

* * * * *